United States Patent
Heeb

[11] Patent Number: 5,872,986
[45] Date of Patent: Feb. 16, 1999

[54] PRE-ARBITRATED BYPASSING IN A SPECULATIVE EXECUTION MICROPROCESSOR

[75] Inventor: Jay S. Heeb, Gilbert, Ariz.

[73] Assignee: Intel Corporation, Santa Clara, Calif.

[21] Appl. No.: 939,809

[22] Filed: Sep. 30, 1997

[51] Int. Cl.⁶ .................................................. G06F 15/76
[52] U.S. Cl. ...................... 395/800.01; 395/376; 395/280
[58] Field of Search ......................... 395/800.01, 800.23, 395/800.32, 828, 280, 287, 306, 369, 311, 728, 376, 384, 561, 580

[56] References Cited

U.S. PATENT DOCUMENTS

| | | | |
|---|---|---|---|
| 5,123,108 | 6/1992 | Olson et al. .............................. | 395/394 |
| 5,465,334 | 11/1995 | Sato .................................... | 395/800.32 |
| 5,542,059 | 7/1996 | Blomgren ........................... | 395/800.41 |
| 5,636,353 | 6/1997 | Ikenaga et al. ......................... | 395/394 |
| 5,717,910 | 2/1998 | Henry ..................................... | 395/568 |
| 5,761,475 | 6/1998 | Yung et al. .............................. | 395/394 |
| 5,764,943 | 6/1998 | Wechsler ................................. | 395/394 |
| 5,778,248 | 7/1998 | Leung ................................ | 395/800.23 |

*Primary Examiner*—Alpesh M. Shah
*Attorney, Agent, or Firm*—Blakely, Sokoloff, Taylor & Zafman LLP

[57] ABSTRACT

A pre-arbitrated bypassing system in a speculative execution microprocessor is provided. The bypassing system provides execution units enhanced to include a comparator and an enabled driver. The comparator compares a bypass address that is broadcast upon instruction decode with the destination address within each execution unit. If there is a match, then the result data is driven onto the bypass bus. Additionally, a suppress signal and validation scheme/apparatus are included to ensure that valid data is being driven onto the bypass bus. A bypass bus and associated apparatus may be included for every potential source operand.

10 Claims, 9 Drawing Sheets

Program Instruction Sequence:

| IP | | |
|---|---|---|
| A | add | r4, r5, r6 |
| B | sub | r6, 1, r6 |
| C | ld | (r6), r7 | bypass ⇒
suppress ⇑

| | ID | RF | EEX1 | EEX2 | EEX3 | WB |
|---|---|---|---|---|---|---|
| | IP<br>INST<br>s1addr<br>s2addr<br>dsta | IP<br>INST<br>s1 from Rf<br>s2 from Rf<br>dsta | IP EXECUTE<br>INST VALID<br>s1<br>s2<br>dsta | IP EXECUTE<br>INST VALID<br>dsta | IP EXECUTE<br>INST VALID<br>dsta | IP<br>RETIRE<br>dsta |
| 1 | A<br>add<br>r4<br>r5<br>r6 | | | | | |
| 2 | B<br>sub<br>r6<br>1<br>r6 | A<br>add<br>r4<br>r5<br>r6 | | | | |
| 3 | C<br>ld<br>r6<br>r7 | B<br>sub<br>~~r6~~<br>1<br>r6 | A<br>add<br>r4<br>r5<br>(r6)   Execute 1 of 1<br>Valid<br>s1 Match! | | | |

PRE-ARBITRATED BYPASSING IN A SPECULATIVE EXECUTION MICROPROCESSOR

BACKGROUND OF THE INVENTION

1. Field of the Invention

The invention relates generally to field of computer architecture. More specifically, the invention relates to bussing in pipelined computer architectures.

2. Description of Related Art

In pipelined processors, an instruction is broken up into two or more execution stages, called pipestages. Once an instruction is decoded, the instruction passes through a register file which contains the architectural state in a series of registers. The register file is a block of registers which contain the valid values of instructions and data for processor execution. In pipelined processors, data can be "retired" or loaded into the register file when the execution stages have successfully completed the execution stage generating the data. Data is typically retired when it has undergone "de-speculation" where the data is validated as accurate by the pipeline control logic. In a pipelined processor, each execution pipestage is implemented in an execution unit, with the first of such execution units receiving instructions and data from the register file. To return data results after execution in a traditional pipelined processor, each execution unit has a separate return bus coupled to the register file or some cases execution units can share an arbitrated return bus. In the traditional pipelined processor, de-speculation is accomplished by each execution unit so that data can be directly retired to the register file.

In a "speculative" pipelined processor, a single despeculation point is used at the end of all execution stages with a deterministic number of execution cycles (e.g., the ALU) so that only one (or few parallel pipelines . . . one for each) return bus is required to retire data to architectural state for a given execution pipeline. (Note that non-deterministic execution pipelines such as the load/store - bus control must have a separate return path.) In both traditional pipelined processors and speculative pipelined processors, "bypassing" or result forwarding can been employed to avoid pipeline stalls by bypassing the result of an instruction A which is required for a following instruction the execution unit handling B directly to the execution unit handling B before the result of A is retired to the register file. In this manner, the register file is bypassed and the result forwarded along the pipe. Bypassing has traditionally been implemented using a "bypass bus" from each execution unit (also referred to as a "bypass source") back to the execution pipestages. Thus, for a speculative pipeline of N pipestages, the cost savings of only having a single return bus (as opposed to N return buses) is offset by having N bypass buses.

FIG. 1 shows such a prior art speculative pipelined processor with one return bus 105 (which is shared) and multiple bypass buses 115, 125 and 135. A register file 100 is coupled to several execution units, EX1 110, EX2 120 and EX3 130. A single return bus 105 couples EX3 130 and register file 100 such that de-speculated results from EX3 130 can be retired to architectural state in register file 100. EX3 130 acts as a single despeculation point where result data is authenticated (e.g., all events, faults, exceptions, etc., have been handled/resolved). To implement bypassing, each of the execution units is connected to its own bypass bus. Thus, EX1 110 has a bypass bus 115, EX2 120 has a bypass bus 125 and EX3 130 has a bypass bus 135. If the processor is 64-bit, then each bypass bus would be at least 64 bits wide (plus 6 bits for the register address) for a total in extra connection width of at least 210 bits. A data cache unit (DCU) 150 is also shown that shares return bus 105 with EEX3.

Further, to implement bypassing, each pipestage must have an address comparator to compare the destination address of each bypass source with the input operand address to the pipestage. If the addresses match, then a multiplexer selects that bypassed result as the input to the pipestage. FIG. 1 shows a comparator 117 for bypass bus 115, a comparator 127 for bypass bus 125 and a comparator 137 for bypass bus 135. When an instruction and its operand are decoded and pass initially through the register file, the pipelining process begins. When the instruction is executed down the pipe via the various execution units (pipestages), intermediate results (which have not been de-speculated and therefore are not yet retired to architectural state) are sent back over the corresponding bypass bus. The result (address) is compared with the input operand address required for the next instruction. If there is a match between the address for the input operand of a subsequent instruction and the bypass bus result address, a multiplexer passes the bypassed result onto EXI 110 for pipelining.

If there are Y total input operands to a particular execution unit and N bypass sources, then a set of Y*N address comparators (one comparator for each bypass bus at each input operand) as well as Y multiplexers with N+1 inputs (N bypass sources+1 from the RF itself) are needed. Thus, at each pipestage, Y multiplexers with N+1 inputs, Y*N comparators and associated wiring are needed to implement bypassing. When a computer system is composed of M such pipelines in parallel, the number of bypass buses, multiplexers and comparators increases in a geometric fashion by at least M. In a 32-bit data bus and 6-bit address bus system, the total number of wires required to implement bypassing would be 38*N*M. The cycle based performance advantage of bypassing the register file comes at a heavy cost in terms of extra hardware (and associated drawbacks such as area, power consumption, etc.) which should be eliminated.

Thus, there is a need to decrease the complexity and cost of speculative pipelining which has the feature of bypassing by providing a single bypass bus that will handle an arbitrary number of bypass sources. Further, there is a need to distribute the comparators and multiplexers within each execution unit to reduce the delay associated in multiplexing outside the execution and reduce the wiring required outside the execution unit. The savings achieved is even greater in a speculative pipeline with many parallel pipelines linked together.

SUMMARY

What is disclosed is a method for bypassing result data from bypass sources in a pipelined processor. First, a bypass address is broadcast on a bypass bus when an instruction is decoded to all bypass sources. Each bypass source compares the broadcast bypass address with a destination address of result data to be generated. If the destination address and the bypass address match, the result data is driven onto the bypass bus.

BRIEF DESCRIPTION OF THE DRAWINGS

Figure 4B:
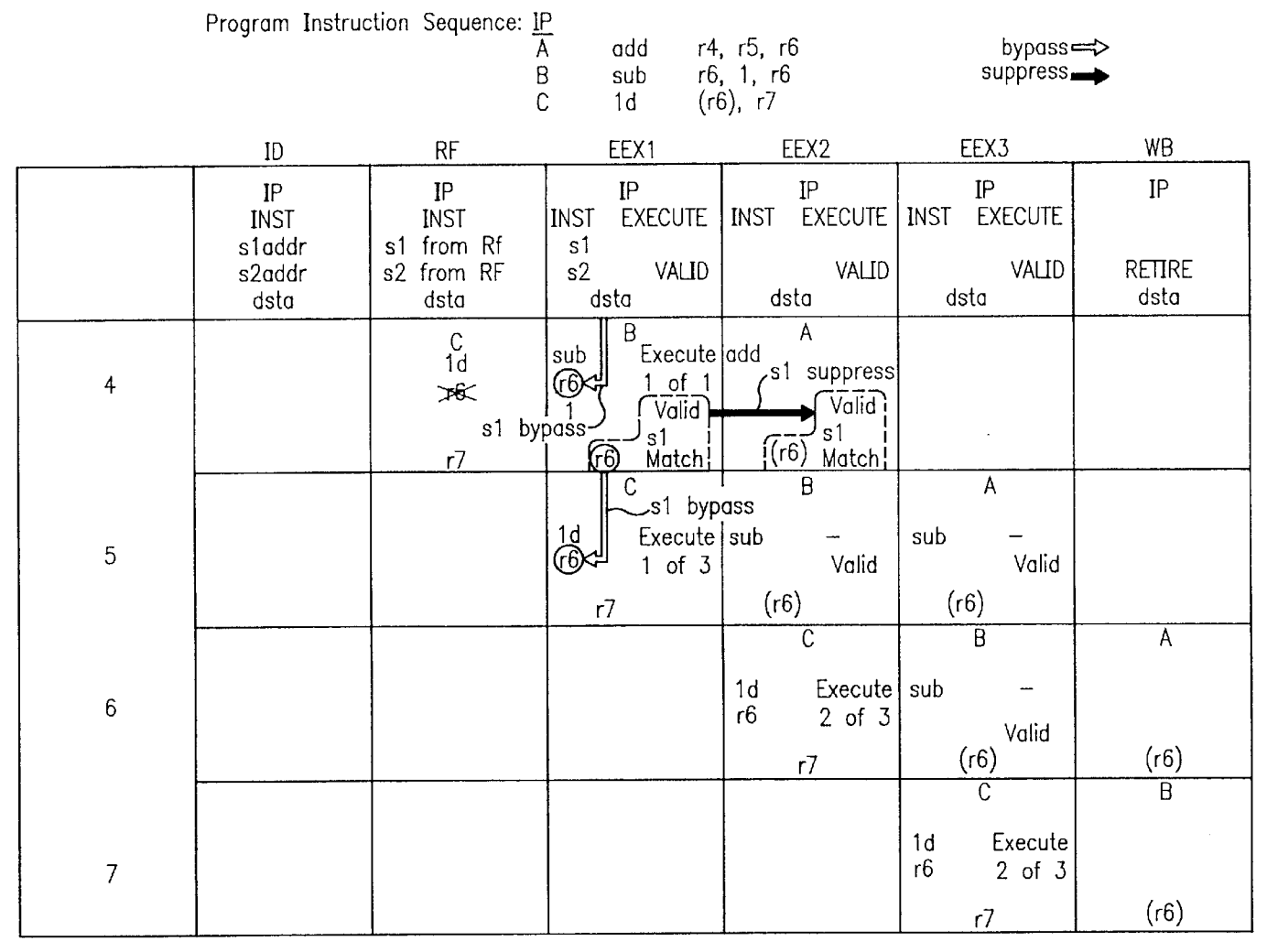

FIGS. 4(A)–4(B) shows a simple case of pipeline contention.

FIG. 5(A)–5(C) shows a complex case of pipeline contention.

DETAILED DESCRIPTION OF THE INVENTION

Figure 1:
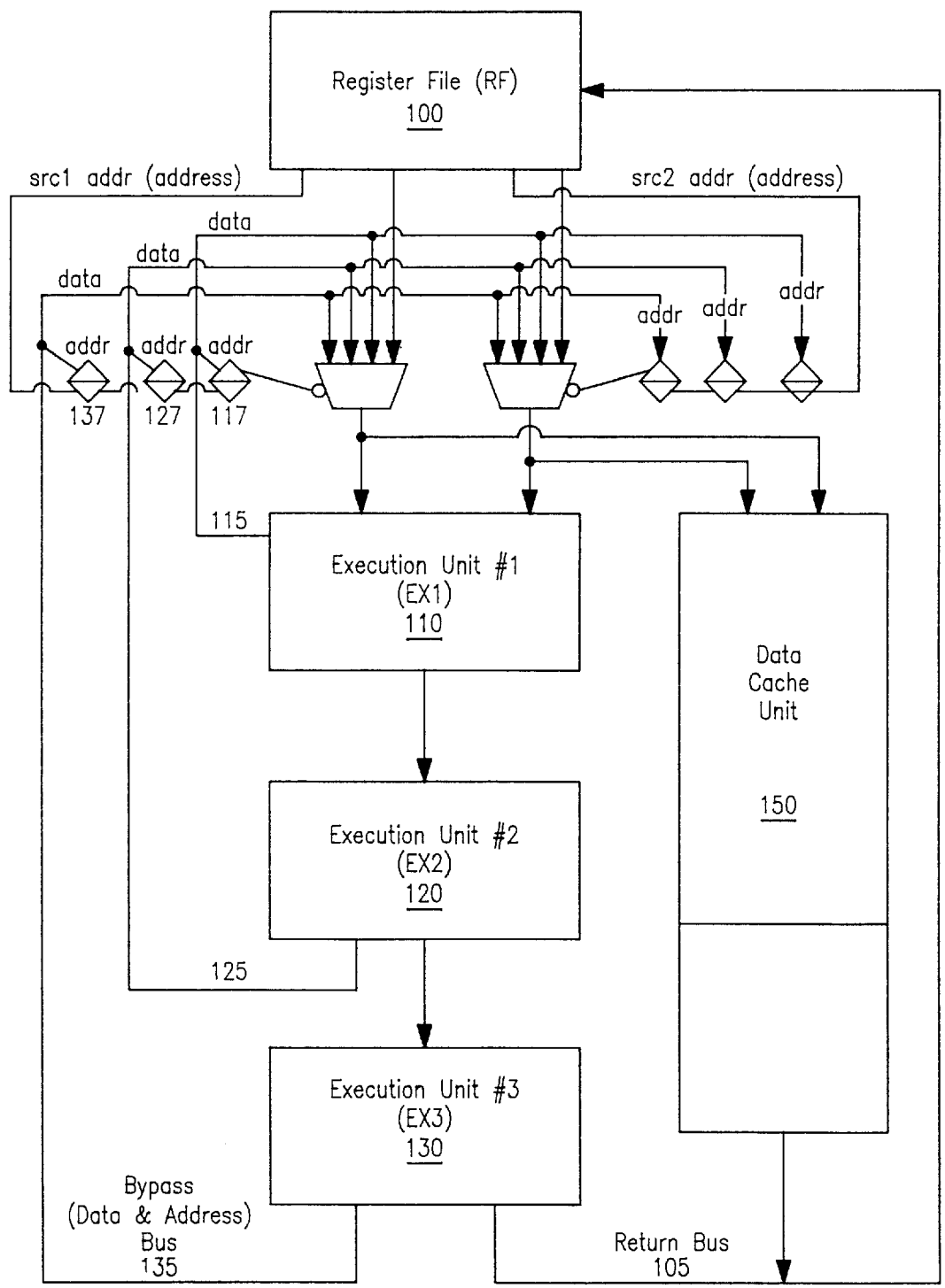
FIG. 1 shows a prior art speculative pipeline processor with a single return bus and multiple bypass buses.

The invention provides an efficient bypassing system for a speculative pipelined processor having an arbitrary number of execution units as bypass sources. A bypass bus associated with each source operand being issued into the execution pipeline is coupled simultaneously to all bypass sources. Each execution unit (bypass source) is enhanced with comparator logic and an enabled driver. A decode unit, which decodes an instruction into its component opcodes and operands (destination addresses) is coupled to a register file which holds the architectural state of the processor. The register file is bypassed by use of the bypass bus such that result data from one execution unit can be provided in a speculative manner to another execution unit (as a source operand) to avoid a stall in the pipeline due to retiring the result data first to the register file.

Clearly, the result produced by using a speculative operand input is itself speculative by virtue of its subsequent pipeline position. The pipeline control logic handles all cases of pipeline exceptions/faults, events with respect of speculative data. There are 3 basic cases for a scoreboard/bypass mechanism:

(1) No "matches"—either in the RF or any bypass source (operand is being generated, but not yet ready, even speculatively) (e.g., a load from memory). As a result of having no hits, there is no valid data available to be used for the execution of the current instruction. For an in-order microprocessor, therefore, the pipeline must stall to wait for valid return data. For an out-of-order microprocessor, however, only the execution unit depending on that data must stall.

(2) Exactly 1 match occurs—matching bypass source drives appropriate bypass bus (both in-order and out-of-order microprocessor).

(3) More than 1 match occurs—must ensure that latest result (in program order) destined for that register is bypassed. This case may arise as a result a write after write hazard. Therefore, a suppression mechanism must exist to ensure only the most recent version of an operand is bypassed.

To achieve efficient bypassing, the addresses of the input (source) operand being issued for execution are broadcast to each bypass source one clock before the instruction using that input operand is issued for execution. Each execution unit uses the comparator logic to compare the broadcasted addresses with a destination address of result data from that execution unit. If the comparator logic detects a match of these addresses, then the enabled driver drives the appropriate bypass bus with result data from that execution unit on the next cycle (in synchronous with the actual execution cycle) using that data as an input operand.

Therefore, rather than retiring the result data first to the register file, the bypass busses forward the result data to the appropriate execution unit via a limited number of busses (equal to the number of input source operands rather than number of bypass sources). Register scoreboarding must be expanded from the Register File lookup to include "match" detection of the bypass address comparators associated with each of the bypass sources.

Figure 2:
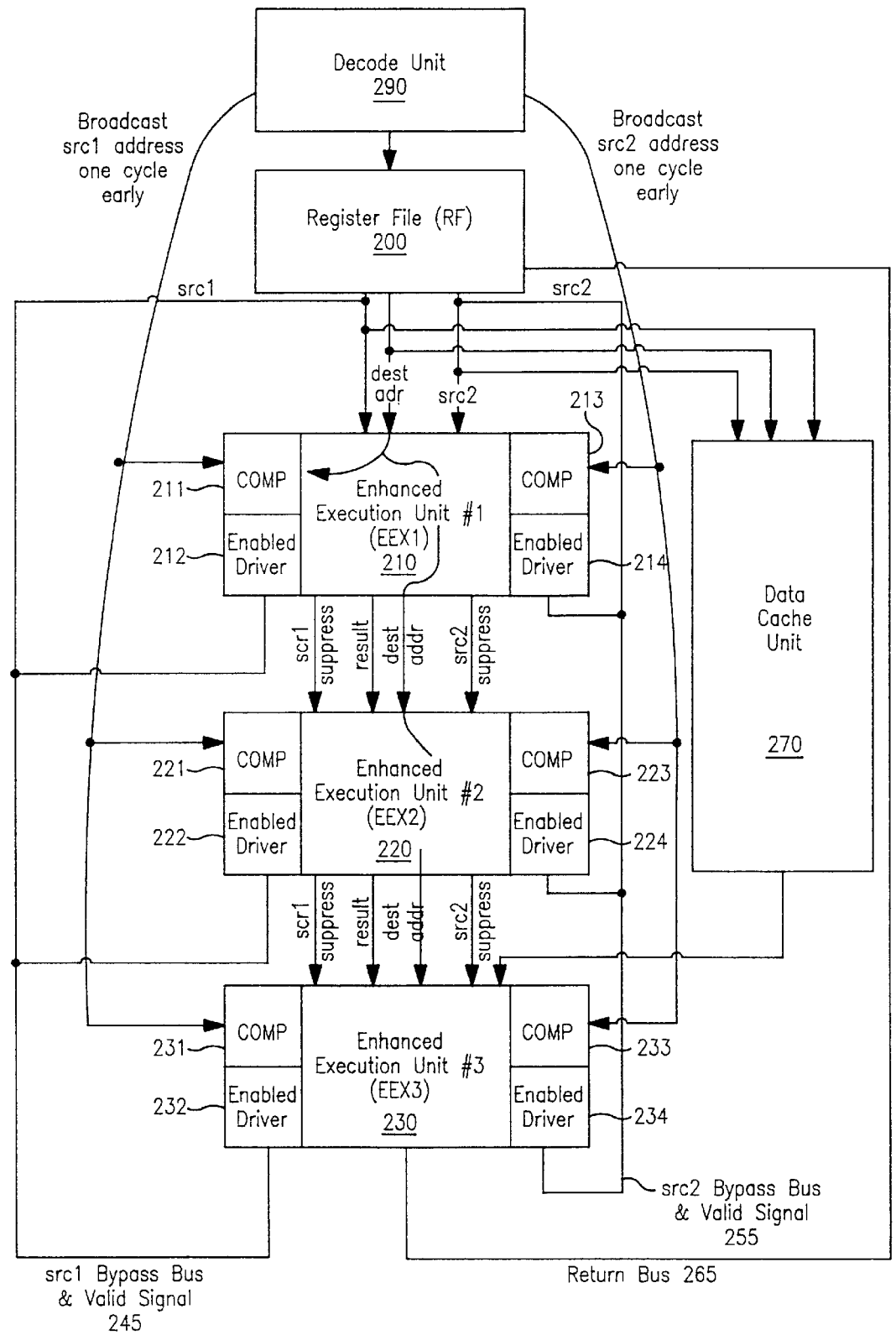
FIG. 2 shows a system for implementing pre-arbitrated bypassing in a speculative pipelined processor according to one embodiment of the invention.

FIG. 2 shows a system for implementing pre-arbitrated bypassing in a speculative pipelined processor according to one embodiment of the invention.

When an instruction is sent to the CPU, the instruction undergoes several stages of decomposition and execution. A first such stage is a decode stage which is handled by decode unit such as decode unit 290. Decode unit 290 splits an instruction into an opcode and operand(s). The opcode extracted by decode unit 290 is a value which designates the type of instruction to be carried out, such as ADD (addition) or MULT (multiply) or LD (load), etc. The operands extracted by decode unit 290 are one or more addresses (referred to variously as source and dest (destination) and for a given instruction will vary in number depending on the type of opcode. The decode unit 290 is coupled to a register file (RF) 200 which contains a number of registers and flags for state control of the processor. RF 200 has temporary registers for storing results of instructions during program execution. RF 200 is coupled to two pipelines. Each pipeline is composed of enhanced execution units which have added features over the execution units of traditional speculative pipelined processors.

FIG. 2 shows two execution pipelines: (1) a 3 pipestage integer (arithmetic and Boolean) execution pipeline (which is synchronous and deterministic with each stage executing in a single cycle), with corresponding enhanced execution units EEX1 210, EEX2 220 and EEX3 230; and (2) a second execution pipeline which executes multiple cycle instructions which is handled through a data cache unit 270. Each enhanced execution unit has coupled within or to it a comparator logic circuit and an enabled driver for each source operand in the system. Thus, for a first source (src1) operand, EEX1 210 has a comparator logic circuit 211 and an enabled driver 212, and EEX2 220 has comparator logic circuit 221 and an enabled driver 222, and, finally, EEX3 230 has a comparator logic circuit 231 and an enabled driver 232. For a second source (src2) operand, EEX1 210 has a comparator logic circuit 213 and an enabled driver 214, and EEX2 220 has comparator logic circuit 223 and an enabled driver 224, and, finally, EEX3 230 has a comparator logic circuit 233 and an enabled driver 234. Each source operand has its own bypass bus and valid signal - bus 245 for src1 and bus 255 for src2. The decode unit 290 broadcasts upon decode the operand addresses for both src1 and src2 (which are the two input operands for this embodiment) which are extracted from the instruction. The broadcast bypass addresses are passed to all execution units one cycle earlier than could be achieved if passed from the register file as in traditional speculative pipelines. Thus, decode unit 290 has a mechanism for distributing the source operands one cycle ahead of execution and must therefore have enhanced pipeline control logic to handle pipeline stalls, exceptions/faults, events, etc. In each execution unit, the broadcast bypass addresses are compared using the comparator logic with the destination address of the data resultant from that execution unit each cycle. If the broadcast bypass addresses and destination address of result data in an enhanced execution unit match, then the appropriate bypass bus will be driven or enabled with that result data. A suppress signal is provided for each source operand that can cascade through the execution stages. The suppress signal prevents data from being prematurely driven onto the bypass bus, as described below. Since the address of the result data is known (due to having been compared successfully against the broadcast bypass (address), the address is not required to be driven to the first execution stage as part of the bypass bus. For a given broadcast bypass address more than one of the enhanced execution units can detect a match. This is referred to as a "write after write" hazard. In the event of multiple matches, the most recent version of the desired operand must be used for correct program execution. This requires that a priority scheme from most to least recent pipestage be implemented. Another solution is not to allow a second instruction to be issued while the destination is scoreboarded (not yet returned). However, this solution has performance drawbacks by adding more stalls.

The bypass busses can therefore be driven with valid result data for forwarding to the start of the execution pipelines. The operation of the bypassing system is better understood by describing the execution of three instructions which are pipelined.

For example, assume that a first instruction submitted to the pipeline is an ADD. The instruction ADD R4, R5, R6 denotes that the contents of data in the source addresses (registers in RF 200) R4 and R5 are to be added and the result placed in register R6. Any subsequent references to R6 in the pipeline should retrieve the contents of R6 only after the ADD instruction is completed. Assume that a second instruction following the ADD is a SUB or subtract instruction. The instruction SUB R6, 1, R5 denotes that the value 1 is to be subtracted from the contents of the register R6 and the result placed into R5. Assume that a third instruction is a LD (load) instruction. The instruction LD (R5),R7 denotes that the contents of register R5 are to be used as the address pointer into which memory contents are to be loaded into R7. This pipelined sequence of instructions, ADD followed by SUB followed by LD, have two opportunities for bypass within the execution pipeline prior to being retired to architectural state. According to this example, the first broadcast bypass addresses would be src1:R4, src2:R5, which are the source operands of the ADD instruction. The ADD instruction when decoded, causes the decode unit 290 to broadcast, via the src1 bypass address bus 245, the address R4 to the three integer execution units EEX1 210, EEX2 220 and EEX3 230 in the integer pipeline, and the memory execution pipeline. On the next (second) cycle, the ADD instruction is in the RF stage, where the operands src1 and src2 are read out, and the corresponding scoreboard (busy) state bits are referenced. Assuming further that none of the execution units is handling result destined for R4, the ADD instruction is executed in the EEX1 pipestage on the third cycle. Assuming the ADD instruction takes one cycle executing entirely in the first execution pipestage EEX1, the result (destined for R6) is ready for bypass in the next (fourth) cycle. Now, back in the second cycle, the SUB instruction is in the decode stage, where R6 is broadcast on the src1 bypass address bus. In the third cycle, the SUB instruction is in the RF stage, where the RF detects that R6 is not valid within the RF itself. Concurrently, the EEX1 detects that (1) its result is destined for R6, and (2) that result will be valid after the EEX1 stage (one cycle ADD) and, therefore, ready for bypassing on the fourth cycle. Since R6 is the result produced by the execution of the ADD instruction in EEX1 210, the comparator logic 211 will produce a successful match with the broadcast bypass address and cause the enabled driver to "enable" (drive) the src1 bypass bus 245 with the result data of the ADD instruction. Since the R6 value has not been retired to architectural state, i.e., returned to the register file, retrieving the R6 operand required by the SUB instruction from RF 200 will produce an invalid result (since the despeculation point is, as with the prior art only after the last pipestage (EEX3 230)) during the write back stage to the RF.

In the fourth cycle, the ADD instruction (and result) will be passed to EEX2 220 when the SUB instruction is passed to EEX1 210 for execution. However, since the bypass address R6 was already broadcast (one cycle earlier), the result data of the ADD instruction will have been driven onto the src1 bypass bus and can allow the SUB instruction to be executed with the up-to-date and current value of R6 without any intervening stall cycles. This is achieved by comparator logic 211 successfully matching the broadcast src1 bypass address (extracted while decoding the SUB instruction), with the result address of the ADD instruction during the third cycle. The SUB instruction can then be executed by using the src1 bypass data as the first source operand. The next instruction in the above example is a load of the contents of memory at the address contained in R5 into the register R7. As the third instruction in the pipeline, the LD instruction will be decoded in the third cycle, when the SUB instruction is in the RF stage, and the ADD instruction is in the first, integer execution stage (EEX1). The decoding of the LD instruction will cause the address of the src1 operand R5 to be driven onto the src1 bypass address bus 245 in the third cycle in order to broadcast to all of the execution units. The LD instruction does not have a src2 operand. On the next cycle (fourth cycle), the completed result of the ADD instruction produced in EEX1, is simply passed down the pipeline to EEX2 220 (EEX2 does not participate in the ADD operation, so the result is just passed on without modification). The SUB instruction (result thereof) passes to EEX1 210 for execution, using the bypassed result of the ADD as src1, and the LD instruction is passed to RF 200. During the fifth cycle, the broadcast src1 bypass address of R5 will match successfully with the result address of the SUB instruction in EEX1 when compared by comparator logic 211. The successful match will cause enabled driver 212 to drive the result data generated by the SUB instruction onto the bypass bus 245. Thus, the LOAD instruction can be successfully completed with the correct value destined for R5, but before R5 has been retired to RF 200.

The task of comparing is distributed across execution units which avoids any multiplexer delay as with traditional speculative pipelines. Further, the reduction in the number of requisite bypass buses significantly decreases cost and complexity. The src1 and src2 bypass busses will drive the result data from the correct execution unit since that execution unit will have already performed the comparison. When the results of the execution units for each of three instructions in the above example are passed to EEX3 230, they are despeculated, i.e., all events, interrupts, faults, exceptions, etc., which could affect the validity of retiring an instruction to architectural state are resolved. They can be retired to RF 200 on the next cycle called the write back cycle, where they will reside in that state until the next register update. A single bypass bus can be provided for each source operand, and thus, in the case of processor that has a maximum number of N source operands, N bypass buses, one for each operand and the corresponding comparator logic and enabled driver may be utilized.

Figure 3:
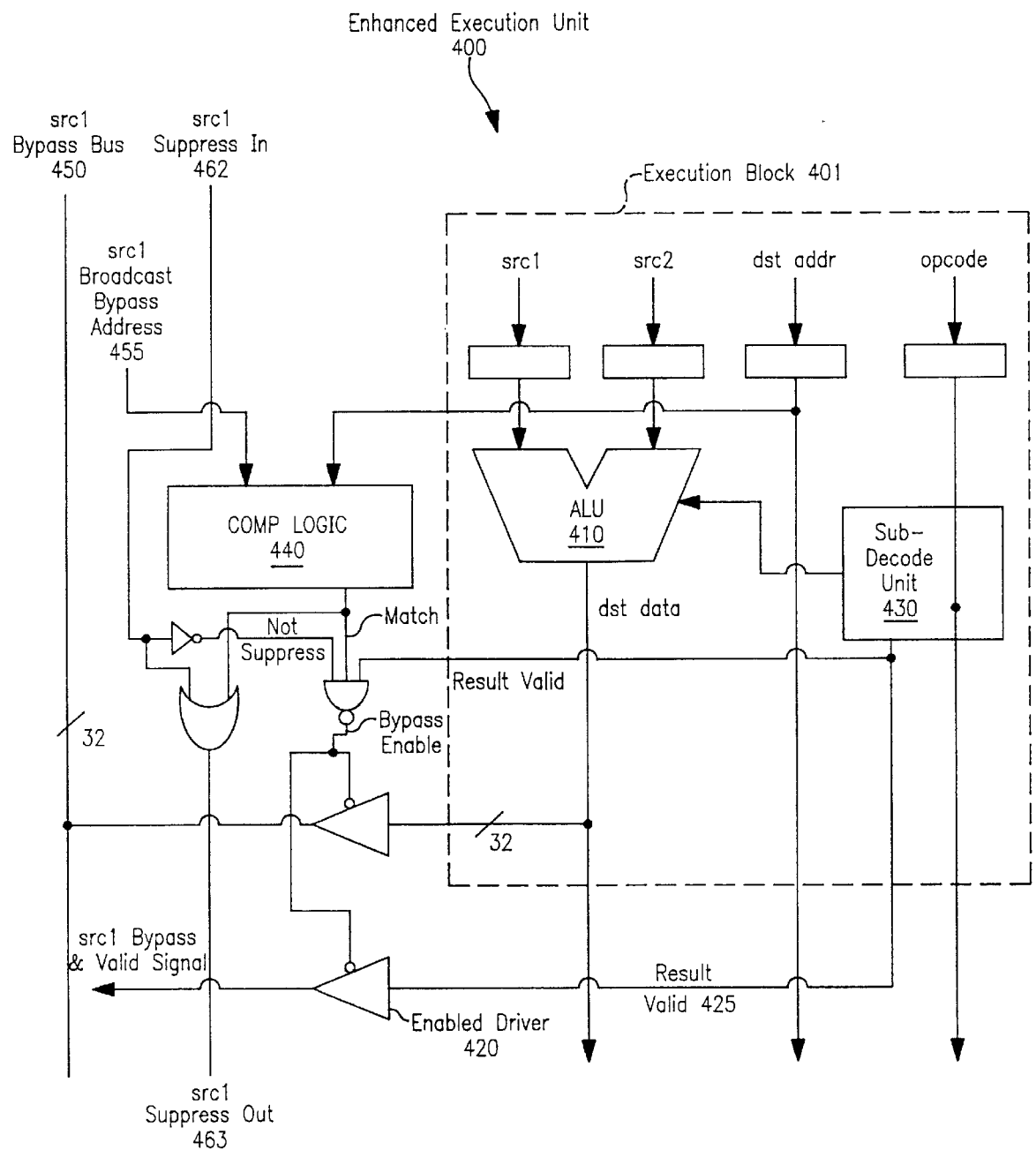
FIG. 3 shows an implementation of enhanced execution units according to one embodiment of the invention.

In addition to a single bypass bus associated with each source operand, the invention in one embodiment also provides an enhanced execution unit. FIG. 3 shows an implementation of enhanced execution units according to one embodiment of the invention.

FIG. 3 shows an enhanced execution unit 400 in one embodiment of the invention. Enhanced execution unit 400 is composed of an execution block 401 coupled to a comparator logic (COMP) 440 and to a enabled driver 420.

The execution block 401 is responsible for performing the instruction given by the opcode passed to it. Execution block 401 consists of a sub-decode unit 430 coupled to an ALU (arithmetic/logic unit) 410. An opcode that is passed to execution unit 400 is processed by sub-decode unit 430 which (1) places the ALU 410 in the appropriate mode for executing the opcode-specified instruction and (2) determines if a multi-cycle instruction is called for and if so, sets the result valid bit over result valid line 425 low. For example, a "shift" instruction may not complete until after the EEX2 stage, and therefore, the EEX1 decode logic knows not to bypass its intermediate result even if the broadcast bypass address 455 is a match (this case now cause a 2 cycle stall in the pipeline). The destination address (labeled "dst adr") is passed to COMP 440 for comparison against the broadcast bypass address 455. The broadcast bypass address 455 is sent over bypass bus 450, such as illustrated in FIG. 3. COMP 440 has a comparator circuit capable of comparing two addresses. Such comparator circuits are well-known in the art and will not be described further. COMP 440 generates a "match" line/signal which indicates if a successful comparison (match) is made between the addresses. Additionally, an input suppress signal 462 is forwarded to indicate if a match is to be ignored (if an earlier pipestage had also detected a match). This suppression scheme ensures that only the most recent version of a register result value is bypassed, in the event that multiple versions/results are active and not yet retired. COMP 440 also has an output line "suppress out" 463 which propagates the suppress signal, if issued, to the next execution unit or pipestage. A suppress signal is active on suppress out 463 if either a match was detected or if a suppress had cascaded from suppress in 462.

For instruction execution, ALU 410 is passed two (or more) source operands, shown as src1 (source 1) and src2 (source 2) in FIG. 3. Depending on the opcode, src1 and src2 are processed by the ALU 410 into a result or destination data (labeled "dst data").

If COMP 440 returns a successful match and the result is valid (or complete) during that execution pipestage, then the destination data is sent to a buffer to be driven during the next cycle as a source operand for subsequent instruction. This is illustrated as the enabled driver 420 which drives the dst data onto the bypass.

If a suppress signal 462 is active, COMP 440 will de-select (not allow) enabled driver 420 from driving dst (destination) data onto bypass bus 450. This is achieved by a three input NAND gate, the three inputs being a match, no suppress and a result valid signal. If these are three conditions true, then the bypass is enabled. Note that the cascaded suppress signal is active on a match regardless of the validity (completed) of the instruction. Even if not yet complete, the most recent version must always suppress older version to preserve program order. The result valid information, qualified by the match and suppress information, must be sent to the pipeline control logic, which must stall the machine if a source operand is not valid in the RF no in any of the potential bypass sources.

Two special cases of invalid results or pipeline contention and their proposed solution are represented by the embodiments shown in FIGS. 4(A)–4(B) and FIGS. 5(A)–5(C).

FIGS. 4(A)–(4B) shows a simple case of pipeline contention.

A first case of pipeline contention may be caused by execution of the following three instructions via pre-arbitrated bypassing: ADD R4, R5, R6; SUB R6, 1, R6 and LD (R6),R7. In this example, all three pipelined instructions have common as either source operand or result destination the register address R6. The ADD instruction executes similar to the example ADD instruction described above for FIG. 2. As shown in FIG. 4, on cycle #2, the ADD is in the RF stage, while the decode unit sends R6, the first source operand of the SUB instructions, to all execution units as the src1 broadcast bypass address. In cycle #3, the RF determines that RF is scoreboarded (it does not have a valid copy), while the EEX1 detects that it has a match on the src1 bypass address, and that the result of the ADD instruction will be valid at the end of the current cycle. Then in cycle #4, when the SUB instruction is passed EEX1 210, the ADD instruction will have already produced a result destined for R6 and will have been passed to EEX2 220. Thus in cycle #4, EEX1 will drive the result of the ADD onto the src1 bypass bus for the execution of the SUB instruction. The SUB instruction R6, 1, R6 also has a destination result address of R6. Thus, in cycle #3, when the LD (R6),R7 instruction is decoded, the decode unit broadcasts R6 as the src1 broadcast bypass address (since the src1 operand is R6). On cycle #4, EEX1 again detects a match on src1 bypass address and valid result, and therefore will drive the result of the SUB instruction on cycle #5. However, EEX2 also detects a src1 bypass match and valid result in cycle #4. So in cycle #4, both the ADD instruction (now passed to EEX3 230) and SUB instruction (now passed to EEX2 220) have R6 as the destination result address. Unless some mechanism is provided, the comparator logic in each execution unit will try to return a successful match on cycle #5 and cause their respective enabled drivers to drive the bypass bus 245 with their corresponding result data. To avoid contention on the bypass bus from the undesired ADD result data, one embodiment of the invention provides a suppress signal for each bypass operand bus which is cascaded down the pipeline. It is required that each stage in the execution pipeline to be single cycle, and sequential. EEX1 210 sends src1 and src2 suppress signals to EEX2 and EEX3, and likewise, EEX2 sends src1 and src2 suppress signals to EEX3. The suppress signals tell the execution unit to which it is sent that a match has occurred upstream on that bypass operand, (in an earlier in pipeline position execution unit and that thus, all downstream execution units are to disengage or disable their enabled drivers. The suppress signal at any given execution stage are simply the "match" signals (from the bypass address comparison with the current result dst (destination) address), OR ed with the input suppress signal from upstream. This accomplishes the cascading down the execution pipeline. Note that a full cycle is dedicated to the bypass address comparisons and the cascaded suppress logic.

Figure 5A:
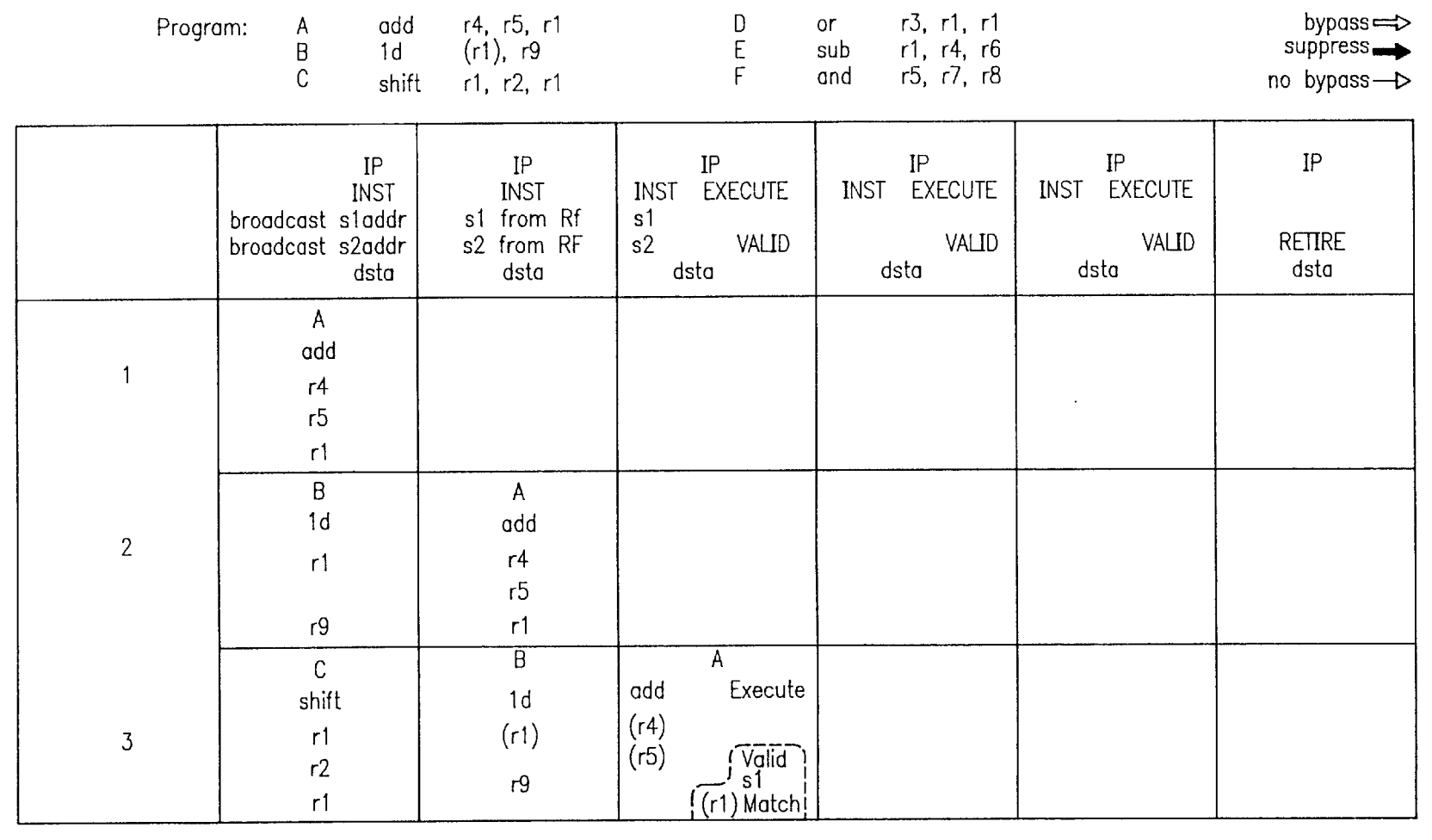
Figure 5B:
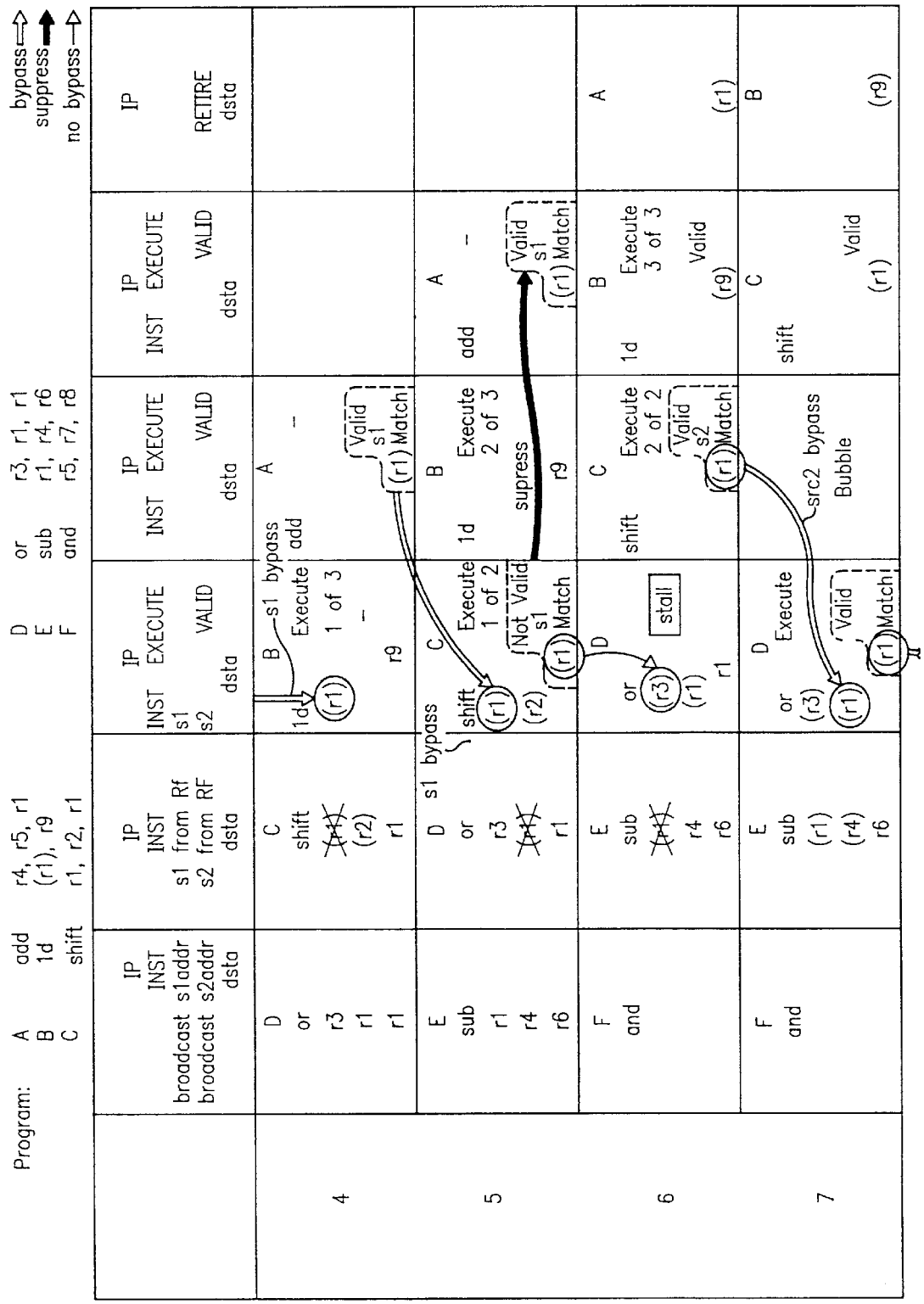
Figure 5C:
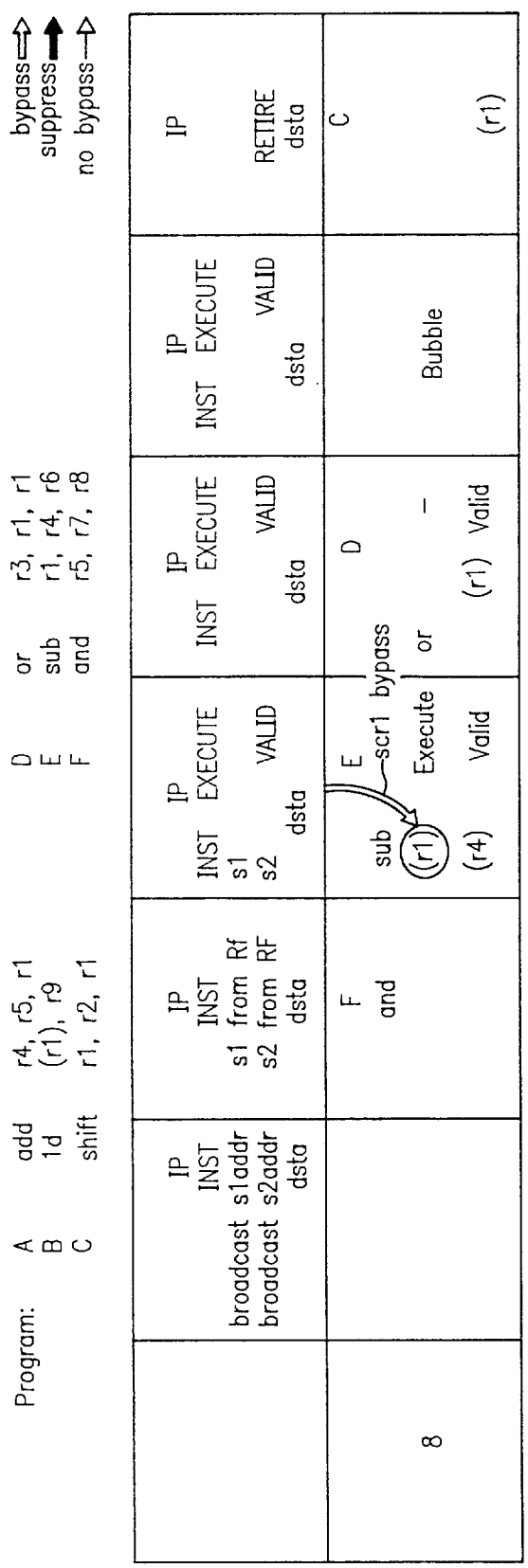

FIGS. 5(A)–5(C) shows a complex case of pipeline contention.

In FIG. 5, a more complex set of interactions within the bypassing and execution pipeline is shown. The first case of interest is the src1 bypass from the ADD result destined for R1 to the LOAD instruction the following cycle. In cycle #2, the LOAD's src1 operand address is broadcast via the src1 bypass address bus. In cycle #3, the RF detects that R1 is scoreboarded (its copy is not valid). At the same time that EEX1 detects (1) a match of the src1 bypass address with the destination address of its result, (2) that the result of the ADD will be valid at the end of the cycle, ready to be bypassed the next cycle, and (3) no input suppression signal is asserted from upstream. Since the EEX1 pipestage is the first of the sequential execution pipestage, no input suppression is possible to EEX1. Therefore, in cycle #4, the EEX1 drives the src1 bypass result bus, and asserts the src1 bypass valid signal. As a result, during cycle #4, the MEM pipeline (broken into MEM1, MEM2, and MEM3 stages) starts the execution of the LOAD by using the src1 bypass result bus as the src1 operand input. Meanwhile, the ADD instruction continues down the execution pipeline until it is retired to architectural state in the RF in cycle #6.

However, on its way, the ADD result is bypassed a second time to the SHIFT instruction 2 cycles after the ADD was issued for execution. To accomplish this, the ID broadcasts the SHIFT bypass addresses in cycle #3. In cycle #4, the RF again determines that its copy of R1 is not valid, while EEX2 detects that: (1) src1 bypass address matches its result destination address (of the ADD), (2) the result is valid after the current cycle, and (3) the upstream suppression signal is not asserted. As a result, on cycle #5, EEX2 drives the src1 bypass result bus, and asserts the src1 bypass valid signal. Then during cycle #5, EEX1 uses the result of the ADD as the src1 operand via the src1 bypass result bus, originating from EEX2, even though the result was completed two cycles earlier, in cycle #3 while the ADD instruction was in the EEX1 pipestage.

The next case is more complex, in that it involves 2 bypass address matches, forcing the suppression mechanism to come into play. During cycle #4, the OR instruction is in the ID pipestage, where the source operand addresses are broadcast via the src1 and src2 bypass address busses. During cycle #5, the RF detects that it does not have a valid copy of R1 to use for src2, while the EEX1 detects: (1) src2 bypass address matches its result destination address (of the SHIFT), (2) the result is NOT VALID after the current cycle, given that a SHIFT instruction requires 2 cycles to complete, and (3) there is no upstream suppression signal. As a result, the EEX1 does NOT have a valid bypass condition, and therefore, even though a src2 bypass address match occurs, does not drive the src2 bypass result bus, and does not assert src2 bypass valid signal. However, EEX1 MUST assert its src2 bypass suppress signal to the downstream pipeline because its copy is the most recent and therefore the only correct one to use, even though it is not yet complete.

Also during cycle #5, the EEX3 pipestage detects: (1) src2 bypass address matches its result destination address (of the ADD), (2) the result is valid after the current cycle, BUT, (3) its src2 input SUPPRESS signal is asserted. Therefore, EEX3 cannot drive its result as the correct bypass result for src2, even though it has a valid result which is destined for the register of interest (R)—it is an old copy relative to the instruction sequence being executed, and would therefore give incorrect results with respect to proper program execution.

As a result of all of this, during cycle #6, the OR instruction does not have a valid copy of R1 to use as its src2 operand, either from the RF or from any of the potential bypass sources in the execution pipeline (the src2 bypass valid signal is not asserted). Therefore, the EEX1 pipestage must STALL during cycle #6 to wait for the correct version of R1 to complete. This stalls the entire microprocessor pipeline from the EEX1 pipestage and everything upstream. However, everything below EEX1 must continue to operate in order to produce the result which stalled EEX1 (in this case the SHIFT instruction).

Also during cycle #6, the pipeline must be able to continue looking for the correct valid version of R1. In order for this to happen in the event of a stall, the broadcast bypass addresses must be preserved and reissued (aka "spun") in order for the potential bypass sources to compare against the correct/current instruction entering the execution pipelines the next cycle. In this stall case, the operand bypass addresses for the OR instruction are reissued (in one embodiment via registers that are not clocked upon a stall, such that they drive the same address values for comparison during cycle #6 as was driven during cycle #5).

Therefore, during cycle #6, the RF again detects that it does not have a valid version of R1, while the EEX2 pipestage now detects that: (1) src2 bypass address matches its result destination address (of the SHIFT), (2) the result of the SHIFT is valid after the current cycle, and (3) there is no upstream suppress signal. As a result, the EEX2 will drive its result (of the SHIFT) onto the src2 bypass result bus, and assert the scr2 bypass valid signal. In this way, even though EEX1 is stalled in cycle #6 (cannot execute the OR instruction) EEX2 is working to prepare for a valid bypass the next cycle (cycle #7) while it is NOT stalled executing the second cycle of the SHIFT instruction, and performing the bypass address comparison and other associated logic.

Then in cycle #7, the src2 bypass occurs properly using the R1 value created by the EEX2 in cycle #6, and the OR executes successfully. This stall procedure has created a "bubble in the pipeline" during cycle #7 in the EEX2 pipestage, because no instructions were passed from EEX1 while it stalled in cycle #6. This creates no functional problem, but clearly is a one cycle performance impact. (Note that compilers for this type of speculative microprocessor would do well to comprehend the instruction and pipeline execution profiles for optimum instruction sequence generation.) The bypass valid bit will prevent multi-cycle instructions from prematurely driving the bypass bus with invalid or incomplete data.

Figure 6:
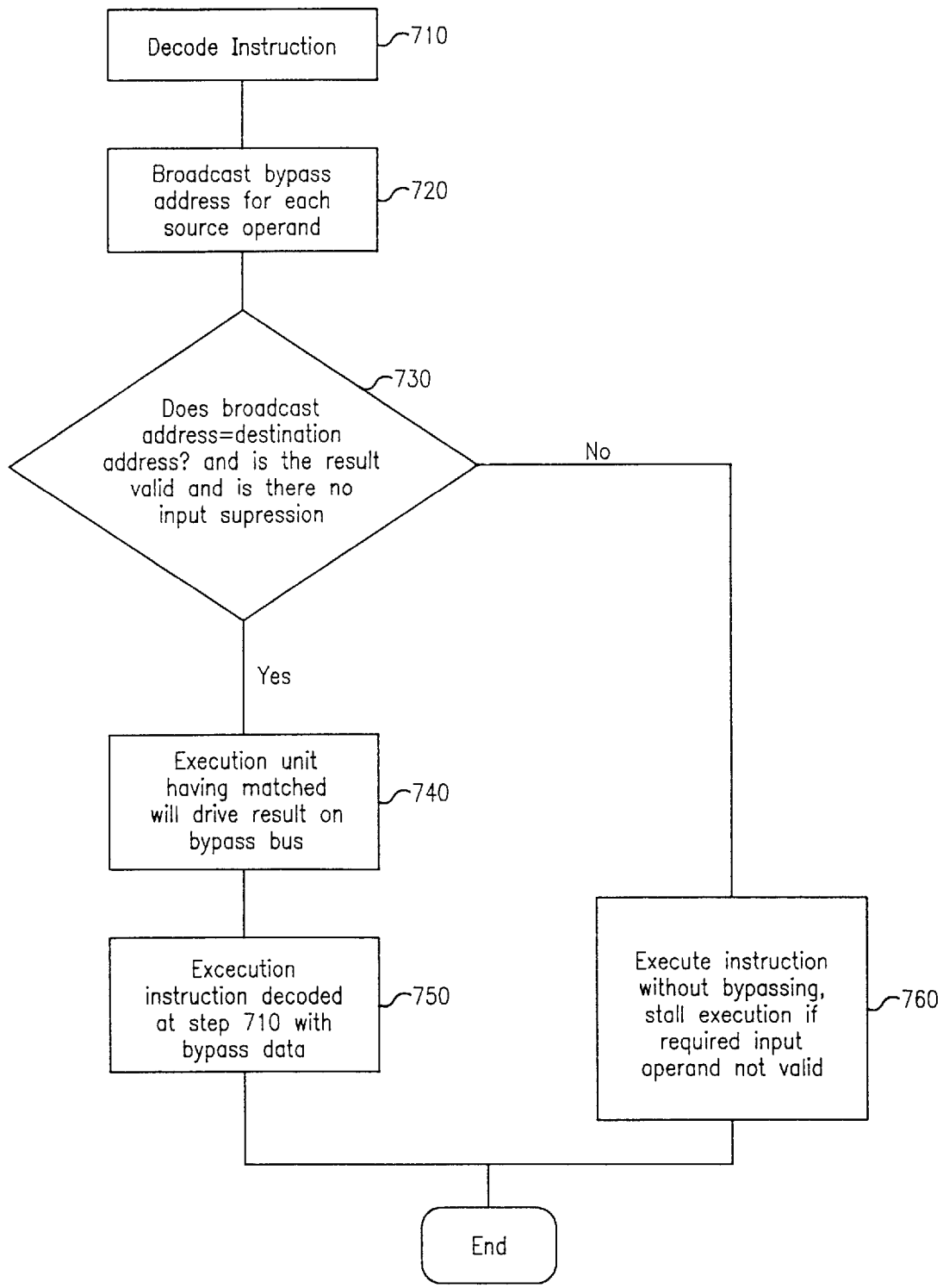
FIG. 6 is a flowchart of intelligent pre-arbitrated bypassing in a speculative pipeline according to one embodiment of the invention.

FIG. 6 is a flowchart of intelligent pre-arbitrated bypassing in a speculative pipeline according to one embodiment of the invention.

According to one embodiment, a methodology for pre-arbitrated bypassing first involves decoding an instruction into opcode and operands via a decode unit or other mechanism (step 710). Next, the instructions source operands are broadcast onto the bypass address busses as the broadcast bypass address associated with each source operand (step 720). At each execution unit, a comparison is performed between the broadcast bypass address and the result address of the instruction (step 730). If the match is successful and the result is valid and there is no input suppression signal, then that execution unit will drive the bypass bus with the result data the unit had generated (step 740). The instruction which was used to broadcast a broadcast bypass address (decoded at step 710) is then executed using the bypass data (step 750). If any of these conditions (step 730) are false then the instruction is executed without bypassing, with execution stalled if the required input operand is not valid (step 760). The above flowchart does not show all the details of the various embodiment of the invention such as the input/output suppress signals, valid signals, etc. The operation of these signals have been described above with respect to other figures and one of ordinary skill in the art will readily be able to modify the methodology of FIG. 7 to include these details.

The above steps are exemplary and may be modified depending on the type of processor employed. Further, in super-pipelined processors, it should be readily understood that the methodology can be duplicated for any pipeline desired.

What is claimed is:

1. A microprocessor comprising:
   a plurality of pipestages, each pipestage capable of executing an instruction of one or more source operands;

a bypass bus for each potential source operand of said microprocessor, each bypass bus coupled simultaneously to each pipestage, said each bypass bus configured to be driven with bypass data destined for one of said pipestages;

an enhanced execution unit coupled within each pipestage, each said enhanced execution unit configured to pass and receive data from each said bypass bus; and wherein each said enhanced execution unit further comprises:

an execution block configured to execute a instruction passed to said pipelined processor to produce a data result;

a comparator logic for each bypass bus coupled to said execution block configured to receive a broadcast bypass address from said bypass bus, said comparator logic comparing said broadcast bypass address with the destination address for said data result from said execution block; and an enabled driver for each bypass bus coupled to said bypass bus and coupled to said comparator logic, said driver driving said bypass bus with said result data.

2. A bypassing system according to claim 1 wherein each said enhanced execution unit further comprises:

a suppress signal propagator coupled to said comparator logic, said propagator configured to receive a suppress signal from one enhanced execution unit and pass said suppress signal to another enhanced execution unit.

3. A bypassing system according to claim 1 wherein each said enhanced execution unit further comprises:

a result validator coupled to said execution block and to said bypass bus, said result validator configured to invalidate a premature result data to prevent same from being driven onto said bypass bus.

4. In a pipelined processor having a decode unit, a plurality of pipestages and a register file, a bypassing system comprising:

a bypass bus for each source operand, said bypass bus simultaneously coupled to all said pipestages, said bypass bus allowing data to be input to said pipestages prior to being retired to said register file; and an enhanced execution unit coupled to each pipestage, each enhanced execution unit including:

an execution block configured to execute an instruction derived from said decode unit to produce a result data, a comparator logic for each bypass bus configured to receive a source address broadcast from said decode unit, said comparator logic configured to said source address with the destination address for result data from the execution unit, and an enabled driver coupled to each said bypass bus and coupled to said comparator logic, said driver configured to drive said bypass bus with said result data and said destination address.

5. A bypassing system according to claim 4 further comprising a single despeculation unit coupled to a selected one of said pipestages, said despeculation unit retiring result data from the enhanced execution unit of said selected one of said pipestages to said register file.

6. A bypassing system according claim 4 further comprising a suppress signal propagator coupled to said comparator logic, said propagator configured to receive a suppress signal from one pipestage and pass said suppress signal to the next consecutive pipestage, said suppress signal configured to prevent driving by said enabled driver.

7. A bypassing system according to claim 4 wherein each enhanced execution unit is a bypass source capable of generating result data to be made available to enhanced execution units of other pipestages through said bypass bus.

8. A bypassing system according to claim 4 further comprising a result validator coupled to said execution block and to said bypass bus, said result validator configured to invalidate a premature result data to prevent same from being driven onto said bypass bus by said enabled driver.

9. A bypassing system according to claim 8 wherein said execution block comprises an Arithmetic/Logic Unit (ALU) configured to receive one or more source operands, said ALU configured to process said source operands into said data result.

10. A bypassing system according to claim 9 wherein said execution block further comprises a sub-decode unit coupled to said result validator, said sub-decode unit configured to receive an opcode and pass a version of said opcode to said ALU.

* * * * *